(12) United States Patent
Tran et al.

(10) Patent No.: US 11,464,093 B2
(45) Date of Patent: Oct. 4, 2022

(54) SINGLE POWER PHASE BUCK AND BOOST CONVERTERS

(71) Applicant: TEXAS INSTRUMENTS INCORPORATED, Dallas, TX (US)

(72) Inventors: Tuan Van Tran, Brighton, CO (US); Vahid Yousefzadeh, Boulder, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/363,768

(22) Filed: Jun. 30, 2021

(65) Prior Publication Data
US 2022/0191990 A1    Jun. 16, 2022

Related U.S. Application Data

(60) Provisional application No. 63/123,559, filed on Dec. 10, 2020.

(51) Int. Cl.
| H05B 45/10 | (2020.01) |
| H05B 45/375 | (2020.01) |
| H05B 45/38 | (2020.01) |
| H05B 45/325 | (2020.01) |

(52) U.S. Cl.
CPC ........... *H05B 45/375* (2020.01); *H05B 45/10* (2020.01); *H05B 45/38* (2020.01); *H05B 45/325* (2020.01)

(58) Field of Classification Search
CPC ........ H05B 45/37; H05B 45/38; H05B 45/54; H05B 45/56; H05B 45/325; H05B 45/345; H05B 45/375; H05B 45/385; H05B 45/3725
See application file for complete search history.

(56) References Cited

U.S. PATENT DOCUMENTS

| 2013/0015781 | A1* | 1/2013 | Kanemitsu | G09G 3/3406 |
| | | | | 315/291 |
| 2013/0293135 | A1* | 11/2013 | Hu | H05B 45/38 |
| | | | | 315/224 |
| 2015/0069906 | A1* | 3/2015 | Niedermeier | H05B 45/48 |
| | | | | 315/77 |
| 2018/0050631 | A1* | 2/2018 | Wonhong | H05B 45/38 |
| 2018/0332680 | A1* | 11/2018 | Ichikawa | F21S 41/663 |
| 2020/0366206 | A1* | 11/2020 | Hariharan | H05B 45/38 |
| 2021/0107397 | A1* | 4/2021 | Unterweger | H05B 45/10 |

\* cited by examiner

*Primary Examiner* — Tung X Le
(74) *Attorney, Agent, or Firm* — Ray A. King; Charles A. Brill; Frank D. Cimino

(57) ABSTRACT

In examples, an apparatus includes a transistor, a switch, a diode, a capacitor, a voltage divider, a second transistor, a resistor, and a controller. The transistor has a transistor drain, a transistor source, and a transistor gate. The switch is adapted to couple a power supply to the transistor drain through an inductor. The diode has a cathode and an anode, the diode cathode coupled to the transistor drain. The capacitor is coupled between the diode anode and ground. The voltage divider is coupled between the diode anode and ground and having a voltage divider output. The second transistor has a second transistor source and a second transistor gate. The resistor is coupled between the diode anode and the second transistor source. The controller is coupled to the transistor gate, the transistor source, the voltage divider output, the diode anode, the second transistor gate, and the second transistor source.

17 Claims, 3 Drawing Sheets

SINGLE POWER PHASE BUCK AND BOOST CONVERTERS

CROSS-REFERENCE TO RELATED APPLICATIONS

The present application claims priority to U.S. Provisional Patent Application No. 63/123,559, which was filed Dec. 10, 2020, is titled "Driver Monitoring System Dual Boost To Buck Single Power Stage," and is hereby incorporated herein by reference in its entirety.

BACKGROUND

An operator awareness or monitoring system, such as may be implemented in an automobile or other vehicle, may include a camera and infrared (IR) light emitting diodes (LEDs). The IR LEDs may be driven by a driver that provides a pulse of current to the IR LEDs at approximately a time that the camera captures a photo, such that at least a portion of an environment captured in the photo is illuminated based on the IR LEDs. The driver may include, or receive power based on, a power converter.

SUMMARY

In an example, an apparatus includes a first transistor, a switch, a diode, a capacitor, a voltage divider, a second transistor, a resistor, and a controller. The first transistor has a first transistor drain, a first transistor source, and a first transistor gate. The switch is adapted to couple a power supply to the first transistor drain through an inductor. The diode has a diode cathode and a diode anode, the diode cathode coupled to the first transistor drain. The capacitor is coupled between the diode anode and ground. The voltage divider is coupled between the diode anode and ground and having a voltage divider output. The second transistor has a second transistor source and a second transistor gate. The resistor is coupled between the diode anode and the second transistor source. The controller is coupled to the first transistor gate, the first transistor source, the voltage divider output, the diode anode, the second transistor gate, and the second transistor source.

In an example, an apparatus includes a first transistor, a diode, a capacitor, a voltage divider, a second transistor, a resistor, and a controller. The first transistor has a first transistor drain, a first transistor source, and a first transistor gate, the first transistor drain adapted to be coupled to an inductor. The diode has a diode cathode and a diode anode, the diode cathode coupled to the first transistor drain. The capacitor is coupled between the diode anode and ground. The voltage divider is coupled between the diode anode and ground and having a voltage divider output. The second transistor has a second transistor source and a second transistor gate. The resistor is coupled between the diode anode and the second transistor source. The controller is coupled to the first transistor gate, the first transistor source, the voltage divider output, the diode anode, the second transistor gate, and the second transistor source. The controller is configured to control the first transistor to interact with the inductor in a boost mode of operation to boost a value of a signal received from the power supply to charge the capacitor.

In an example, a system include a camera, an infrared (IR) light emitting diode (LED), a driver coupled to the IR LED, and a first controller. The first controller is coupled to the camera and the driver and is configured to provide a control signal to the camera and the driver to cause the driver to cause the IR LED to emit IR light while the camera captures an image. The driver includes a first transistor, a diode, a capacitor, a voltage divider, a second transistor, a resistor, and a second controller. The first transistor has a first transistor drain, a first transistor source, and a first transistor gate, the first transistor drain adapted to be coupled to an inductor. The diode has a diode cathode and a diode anode, the diode cathode coupled to the first transistor drain. The capacitor is coupled between the diode anode and ground. The voltage divider is coupled between the diode anode and ground and having a voltage divider output. The second transistor has a second transistor source, and a second transistor gate. The resistor is coupled between the diode anode and the second transistor source. The second controller is coupled to the first transistor gate, the first transistor source, the voltage divider output, the diode anode, the second transistor gate, and the second transistor source.

BRIEF DESCRIPTION OF THE DRAWINGS

The same reference numbers (or other feature designators) are used in the drawings to designate the same or similar (functionally and/or structurally) features.

DETAILED DESCRIPTION

As described above, IR LEDs in an operator awareness system may be driven by a driver that provides a pulse of current to the IR LEDs at approximately a time that the camera captures a photo, such that at least a portion of an environment captured in the photo is illuminated based on the IR LEDs. The driver may drive the IR LEDs with a current pulse that is narrow in size, such as less than about 2 milliseconds, but large in value, such as about 5 amperes (A), or greater, at a forward voltage of the IR LEDs of about 7 volts (V). To reduce cost, as well as weight, the IR LEDs may be coupled to the driver via a conductor, such as a wire, that is comparatively narrow in diameter or gauge. The combination of large value current pulse and narrow-gauge conductor may cause a voltage drop that occurs on the conductor to also be large in size. In some examples, such as if the conductor is a power line of the system, the voltage drop may cause at least some components to reset. For example, the voltage drop may cause the driver to reset.

To mitigate the effects of the voltage drop, the voltage provided by the power line may be boosted, such as via a boost converter. For example, a boost converter may boost the voltage and store current in a capacitor. Responsive to a trigger signal for illuminating the IR LEDs, a buck converter may activate and cause the capacitor to be discharged, providing a current pulse to the IR LEDs. However, the boost converter and the buck converter are a two-power stage solution that includes two inductors. This increases a component count and physical footprint size of the solution, directly and indirectly increasing cost of the solution, and rendering the solution impractical, disadvantaged, or unsuitable for some application environments.

This description describes a single power stage solution to mitigate the effects of the voltage drop described above. In at least some examples, the single power stage includes both a boost mode that operates according to voltage mode control to charge a capacitor and a buck mode that operates according to current mode control to discharge the capacitor and provide a current pulse to a load. In some examples, the boost mode and the buck mode are each implemented by separate transistors. In other examples, the boost mode and the buck mode are implemented using the same transistor.

Figure 1:
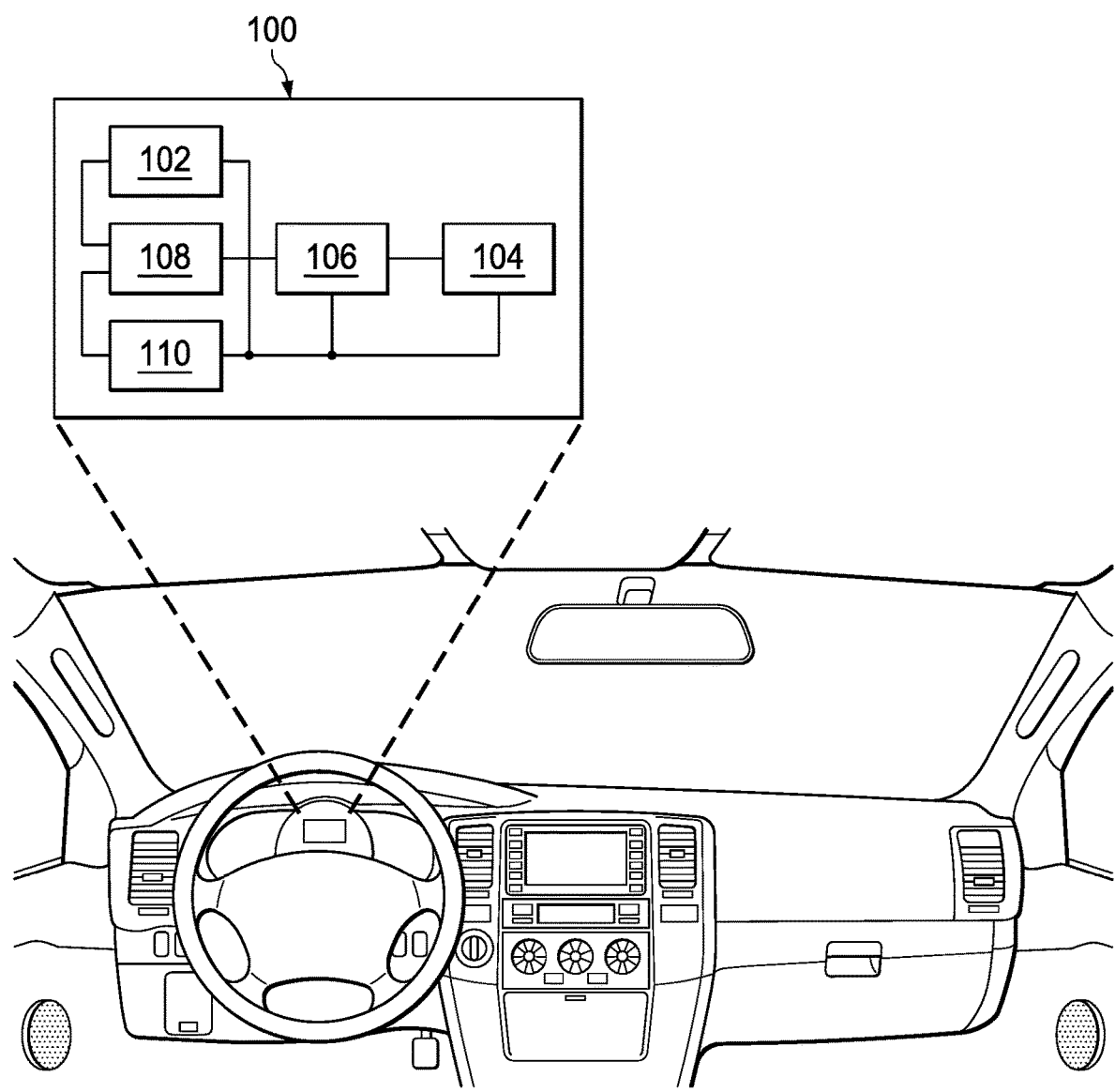
FIG. 1 is a diagram of a system in accordance with various examples.

FIG. 1 is a diagram of a system 100 in accordance with various examples. In at least some examples, the system 100 is representative of a driver or operator awareness or monitoring system, such as in an automobile or other vehicle. Accordingly, in at least some examples, the system 100 is implemented in an instrument cluster of an automobile. In other examples, although not shown in FIG. 1, the system 100 is implemented in any other suitable location, such as a steering or control column, an infotainment center, a rearview mirror, etc. As shown in FIG. 1, the system 100 includes a camera 102, an IR LED 104, a driver 106, and a controller 108. The controller 108 may be coupled to the camera 102 and the driver 106, which may in turn be coupled to the IR LED 104. The camera 102, the IR LED 104, the driver 106, and the controller 108 may receive power from a power supply 110. While a single IR LED 104 is shown in FIG. 1, in at least some examples any number of IR LEDs 104, or LEDs of any type, may be coupled to the driver 106.

In an example of operation of the system 100, the controller 108 may be configured to provide a control signal to the camera 102 and the driver 106. The control signal, if asserted, may cause the camera 102 to capture an image and cause the driver 106 to provide a current pulse to the IR LED 104 to cause the IR LED 104 to emit IR light, illuminating at least a portion of an area included in the image captured by the camera 102. In at least some examples, the driver 106 includes a single power stage (e.g., includes, or is adapted to be coupled to, a single inductor) for providing the current pulse. For example, while the control signal is deasserted, the driver 106 may operate the power stage in a boost mode of operation to charge an energy storage device, such as a capacitor (not shown). Responsive to assertion of the control signal, the driver 106 may operate the power stage in a buck mode of operation to discharge the energy storage device to provide current to the IR LED 104. In at least some examples, the boost mode of operation and the buck mode of operation may be implemented by a same power stage of the driver 106.

Figure 2:
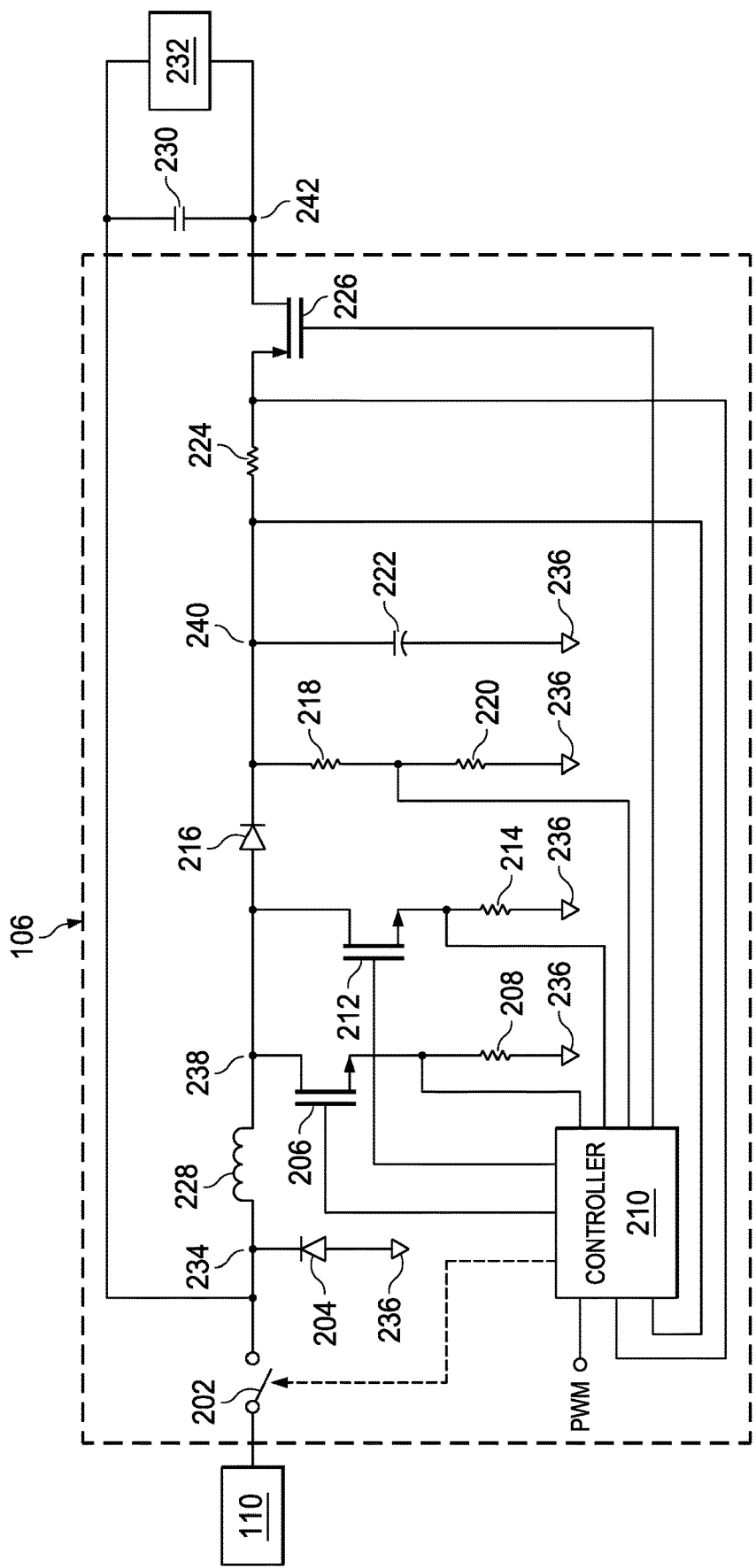
FIG. 2 is a circuit diagram of a driver in accordance with various examples.

FIG. 2 is a circuit diagram of the driver 106 in accordance with various examples. In at least some examples, the driver 106 includes a switch 202, a diode 204, a transistor 206, a resistor 208, a controller 210, a transistor 212, a resistor 214, a diode 216, a resistor 218, a resistor 220, a capacitor 222, a resistor 224, and a transistor 226. The driver 106 may be adapted to be coupled to an inductor 228, a capacitor 230, and a load 232. In at least some examples, the load 232 includes an IR LED. The driver 106 may also be adapted to be coupled to the power supply 110.

In an example architecture of the driver 106, the switch 202 is adapted to be coupled between the power supply 110 and a node 234. In at least some examples, the switch 202 is also coupled to the controller 210 such that the controller 210 provides a control signal to the switch 202 to cause the switch 202 to be conductive or non-conductive between its terminals. The diode 204 may have an anode coupled to the node 234 and a cathode adapted to be coupled to a ground voltage potential 236. The driver 106 may be adapted to be coupled to the inductor 228 between the node 234 and a node 238. The transistor 206 may have a drain coupled to the node 238, a source coupled through the resistor 208 to the ground voltage potential 236, and a gate terminal. The transistor 212 may have a drain coupled to the node 238, a source coupled through the resistor 214 to the ground voltage potential 236, and a gate terminal. The diode 216 may be coupled between the node 238 and a node 240. The resistor 218 and the resistor 220 may be coupled in series between the node 240 and the ground voltage potential 236 so as to form a voltage divider between the node 240 and the ground voltage potential 236. The capacitor 222 may be coupled between the node 240 and the ground voltage potential 236. The transistor 226 may have a source terminal coupled through the resistor 224 to the node 240, a drain coupled to a node 242, and a gate. In at least some examples, the node 242 is an output node of the driver 106. Accordingly, the driver 106 may be adapted to be coupled to the capacitor 230 and the load 232 between the node 242 and the node 234.

The controller 210 may have a first input configured to receive a control signal, such as from the controller 108, as described above. The controller 210 may have a second input coupled to the source of the transistor 206, a third input coupled to the source of the transistor 212, a third input coupled to an output of the voltage divider formed by the resistor 218 and the resistor 220, a fourth input coupled to the node 240, and a fifth input coupled to the source of the transistor 226. The controller 210 may also have a first output coupled to the switch 202, a second output coupled to the gate of the transistor 206, a third output coupled to the gate of the transistor 212, and a fourth output coupled to the gate of the transistor 226.

In an example of operation of the driver 106, a control signal (PWM) is received by the controller 210. In at least some examples, PWM having an asserted value causes the driver 106 to provide current to the load 232 and PWM having a deasserted value causes the driver 106 to turn off the load 232. Responsive to receipt of PWM having a deasserted value, the controller 210 may control the switch 202 to close, electrically coupling the node 234 to the power supply 110. Further responsive to receipt of PWM having the deasserted value, the controller 210 may control the transistor 212 and the transistor 226 to each be non-conductive (e.g., "off"). The controller 210 may also control the transistor 206 to switch on and off at a duty cycle configured to increase a voltage of a signal provided at the node 238 in comparison to a voltage provided at the node 234. For example, the controller 210 controls the transistor 206 to switch on and off in a pattern configured to cause the transistor 206 and the inductor 228 to operate as a boost power converter or boost switching converter. The diode 216 may pass the voltage provided at the node 238 to the node 240, minus any forward voltage drop caused by the diode 216. The voltage provided at the node 240 may charge the capacitor 222 and be blocked from passage to the load 232 by the transistor 226. In at least some examples, the controller 210 controls the transistor 206 in a constant voltage mode by regulating a value of the voltage provided at the node 240. In at least some examples, the controller 210 monitors the voltage provided at the node 240 based on a voltage provided at the output of the voltage divider formed by the resistor 218 and the resistor 220.

Responsive to receipt of PWM having an asserted value, the controller 210 may control the switch 202 to open, electrically decoupling the node 234 from the power supply 110. The diode 204 may clamp the voltage provided at the node 234, preventing the voltage provided at the node 234 from becoming negative if the switch 202 is controlled to open prior to current stored in the inductor 228 fully discharging. Further responsive to receipt of PWM having the asserted value, the controller 210 may control the transistor 206 to be off and the transistor 226 to be conductive (e.g., "on"). The controller 210 may also control the transistor 212 to switch on and off at a duty cycle configured to decrease a voltage of a signal provided at the node 238. For example, the controller 210 controls the transistor 212 to switch on and off in a pattern configured to cause the transistor 212 and the inductor 228 to operate as a buck power converter or buck switching converter. The diode 216 operates as a blocking transistor that prevents the flow of current from the node 240 to the node 238 such that current may flow from the capacitor 222, through the resistor 224 and transistor 226, to the load 232. In at least some examples, the controller 210 controls the transistor 212 in a constant current mode by regulating a value of the current flowing through the resistor 224.

In at least some examples, although not shown in FIG. 2, the transistor 212 and the resistor 214 may be omitted from the driver 106. Alternatively, the transistor 206 and the resistor 208 may be omitted from the driver 106, in which case the transistor 212 and the resistor 214 would operate in substantially the same manner as will be described below with respect to the transistor 206 and the resistor 208. In such an example, the controller 210 may control the transistor 206 to, along with the inductor 228, operate as both the boost converter and the buck converter based on a value of PWM, and therefore whether the switch 202 is closed or open. For example, responsive to receipt of PWM having the deasserted value, the controller 210 may control the transistor 226 to be off and control the transistor 206 to switch on and off at a duty cycle configured to increase a voltage of a signal provided at the node 238 in comparison to a voltage provided at the node 234, causing the transistor 206 and the inductor 228 to operate as a boost power converter or boost switching converter. The diode 216 may pass the voltage provided at the node 238 to the node 240, minus any forward voltage drop caused by the diode 216. The voltage provided at the node 240 may charge the capacitor 222 and be blocked from passage to the load 232 by the transistor 226. In at least some examples, the controller 210 controls the transistor 206 in a constant voltage mode by regulating a value of the voltage provided at the node 240.

Responsive to receipt of PWM having an asserted value, the controller 210 may control the transistor 206 to switch on and off at a duty cycle configured to decrease a voltage of a signal provided at the node 238. For example, the controller 210 controls the transistor 206 to switch on and off in a pattern configured to cause the transistor 206 and the inductor 228 to operate as a buck power converter or buck switching converter. The diode 216 operates as a blocking transistor that prevents the flow of current from the node 240 to the node 238 such that current may flow from the capacitor 222, through the resistor 224 and transistor 226, to the load 232. In at least some examples, the controller 210 controls the transistor 206 in a constant current mode by regulating a value of the current flowing through the resistor 224.

Figure 3:
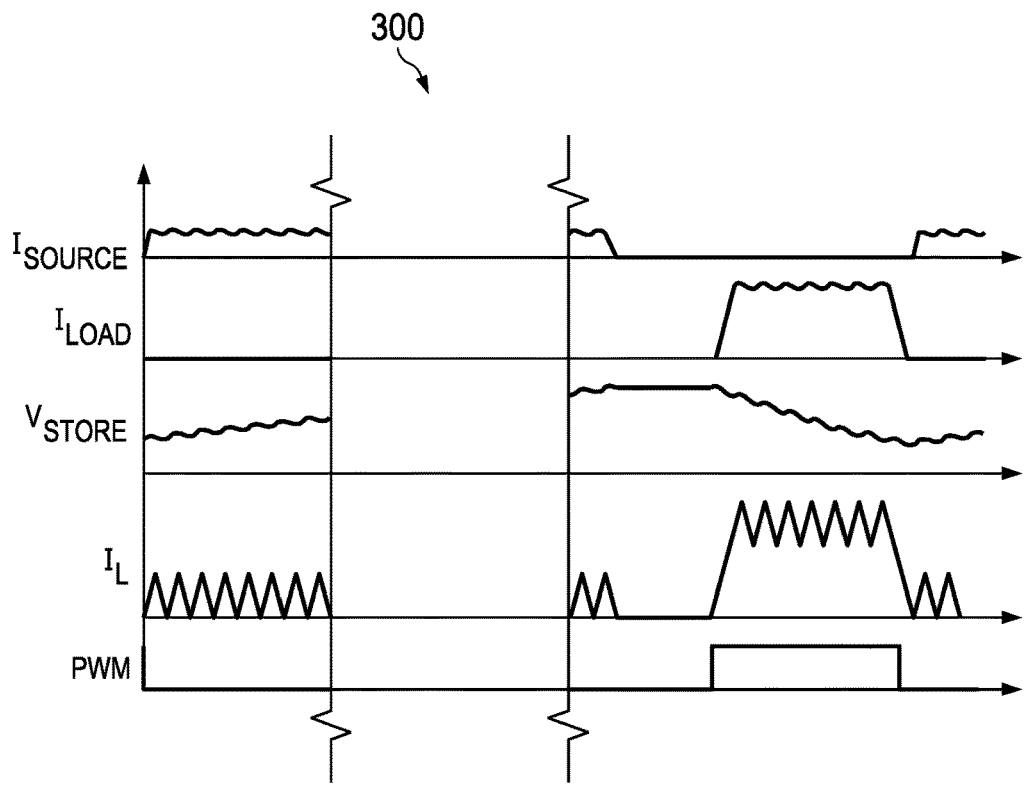
FIG. 3 is diagram of waveforms in accordance with various examples.

FIG. 3 is a diagram 300 of signal waveforms in accordance with various examples. In some examples, at least some of the waveforms of the diagram 300 correspond to signals present in the system 100 and/or driver 106. Accordingly, reference may be made to the components and/or signals of the system 100 in describing the diagram 300. The diagram 300 shows a current of the power supply 110 ($I_{SOURCE}$), which in some examples may be a battery, having a vertical axis representative of current and a horizontal axis representative of time. The diagram 300 also shows a current of the load 232 ($I_{LoAD}$), which in some examples may include a LED, such as an IR LED, having a vertical axis representative of current and a horizontal axis representative of time. The diagram 300 also shows a voltage provided at the node 240 ($V_{STORE}$), having a vertical axis representative of voltage and a horizontal axis representative of time. The diagram 300 also shows a current of the inductor 228 ($I_L$), having a vertical axis representative of current and a horizontal axis representative of time. The diagram 300 also shows PWM, having a vertical axis representative of voltage and a horizontal axis representative of time.

As shown by the diagram 300, responsive to PWM becoming deasserted, $V_{STORE}$ increases in value based on operation of the boost converter formed by the transistor 206 and the inductor 228, as well as current drawn from the power supply 110. Current draw from the power supply 110 by the transistor 206 and the inductor 228 ceases responsive to $V_{STORE}$ reaching a threshold defined by a regulation point of the boost converter. Responsive to assertion of PWM, the $V_{STORE}$ decreases in value as the capacitor 222 discharges and based on operation of the buck converter formed by the transistor 212 (or the transistor 206) and the inductor 228. Based on the discharge of the capacitor 222 and current flowing from the capacitor 222 to the load 232, LOAD increases in value.

Figure 4:
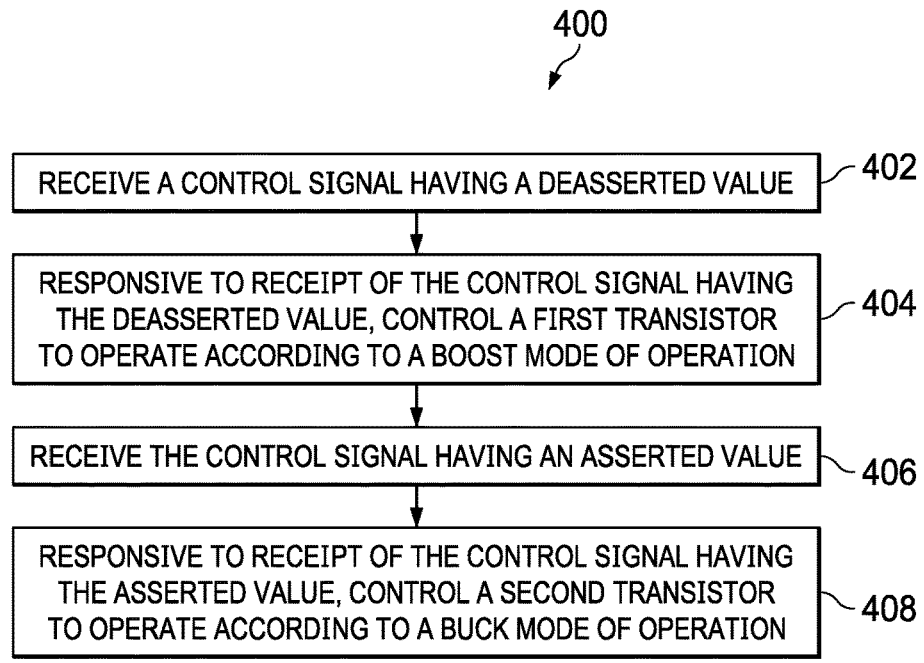
FIG. 4 is flowchart of a method in accordance with various examples.

FIG. 4 is a flowchart of a method 400 in accordance with various examples. In some examples, the method 400 is implemented at least in part by the driver 106, such as via the controller 210. Accordingly, reference may be made to the components and/or signals of the system 100 in describing the method 400. In at least some examples, the method 400 is implemented to provide a load current to a load based on buck and boost operations that share a single power stage.

At operation 402, a control signal having a deasserted value is received. At operation 404, responsive to receipt of the control signal having the deasserted value, the controller controls a first transistor to operate according to a boost mode of operation to increase a voltage provided by a power supply, such as the power supply 110. The controller may control the first transistor according to a constant voltage mode control scheme. In at least some examples, a capacitor or other energy storage device may charge based on the increase voltage.

At operation 406, the control signal is received having an asserted value. At operation 408, responsive to receipt of the control signal having the asserted value, the controller controls a second transistor to operate according to a buck mode of operation to cause the charged energy storage device to discharge to a load. The controller may control the second transistor according to a constant current mode control scheme. In some examples, the controller may instead control the first transistor to operate according to the buck mode of operation to cause the charged energy storage device to discharge to the load, controlling the first transistor according to the constant current mode control scheme.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party. Circuits described herein are reconfigurable to include the replaced components to provide functionality at least partially similar to functionality available prior to the component replacement.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

Modifications are possible in the described examples, and other examples are possible within the scope of the claims.

What is claimed is:

1. An apparatus, comprising:
a first transistor having a first transistor drain, a first transistor source, and a first transistor gate;
a switch adapted to couple a power supply to the first transistor drain through an inductor;
a diode having a diode cathode and a diode anode, the diode cathode coupled to the first transistor drain;
a capacitor coupled between the diode anode and ground;
a voltage divider coupled between the diode anode and ground and having a voltage divider output;
a second transistor having a second transistor source and a second transistor gate;
a resistor coupled between the diode anode and the second transistor source;
a controller coupled to the first transistor gate, the first transistor source, the voltage divider output, the diode anode, the second transistor gate, and the second transistor source; and
a third transistor having a third transistor drain, a third transistor source, and a third transistor gate, the third transistor drain coupled to the first transistor drain, the third transistor source coupled to the controller, and the third transistor gate coupled to the controller.

2. The apparatus of claim 1, wherein the second transistor has a second transistor drain adapted to be coupled to a load.

3. The apparatus of claim 1, wherein the resistor is a first resistor, the apparatus further comprising a second resistor coupled between the third transistor source and ground.

4. The apparatus of claim 1, wherein the resistor is a first resistor, the apparatus further comprising a second resistor coupled between the first transistor source and ground.

5. The apparatus of claim 1, wherein:
the controller is configured to, responsive to a control signal having an asserted value, control the first transistor to interact with the inductor in a boost mode of operation to charge the capacitor, and
the controller is configured to, responsive to the control signal having a deasserted value, control the first transistor to interact with the inductor in a buck mode of operation to discharge the capacitor through the resistor and the second transistor.

6. An apparatus, comprising:
a first transistor having a first transistor drain, a first transistor source, and a first transistor gate, the first transistor drain adapted to be coupled to an inductor;
a diode having a diode cathode and a diode anode, the diode cathode coupled to the first transistor drain;
a capacitor coupled between the diode anode and ground;
a voltage divider coupled between the diode anode and ground and having a voltage divider output;
a second transistor having a second transistor source and a second transistor gate;
a resistor coupled between the diode anode and the second transistor source; and
a controller coupled to the first transistor gate, the first transistor source, the voltage divider output, the diode anode, the second transistor gate, and the second transistor source, the controller configured to control the first transistor to interact with the inductor in a boost mode of operation to boost a value of a signal received from the power supply to charge the capacitor; and
a third transistor having a third transistor drain, a third transistor source, and a third transistor gate, the third transistor drain coupled to the first transistor drain, the third transistor source coupled to the controller, and the third transistor gate coupled to the controller.

7. The apparatus of claim 6, wherein the controller is configured to control the first transistor to interact with the inductor in a buck mode of operation to discharge the capacitor through the resistor and the second transistor.

8. The apparatus of claim 7, wherein the controller is configured to control the first transistor to interact with the inductor in the buck mode of operation according to constant current control.

9. The apparatus of claim 6, wherein the controller is configured to control the first transistor to interact with the inductor in the boost mode of operation according to constant voltage control.

10. The apparatus of claim 6, wherein the controller is configured to control the second transistor to interact with the inductor in a buck mode of operation to discharge the capacitor through the resistor and the second transistor.

11. The apparatus of claim 10, wherein the controller is configured to control the third transistor to interact with the inductor in the boost mode of operation according to constant current control.

12. A system, comprising:
a camera;
an infrared (IR) light emitting diode (LED);
a driver coupled to the IR LED; and
a first controller coupled to the camera and the driver and configured to provide a control signal to the camera and the driver to cause the driver to cause the IR LED to emit IR light while the camera captures an image, the driver comprising:
  a first transistor having a first transistor drain, a first transistor source, and a first transistor gate, the first transistor drain adapted to be coupled to an inductor;
  a diode having a diode cathode and a diode anode, the diode cathode coupled to the first transistor drain;
  a capacitor coupled between the diode anode and ground;
  a voltage divider coupled between the diode anode and ground and having a voltage divider output;
  a second transistor having a second transistor source, and a second transistor gate;
  a resistor coupled between the diode anode and the second transistor source;
  a second controller coupled to the first transistor gate, the first transistor source, the voltage divider output, the diode anode, the second transistor gate, and the second transistor source; and
  a third transistor having a third transistor drain, a third transistor source, and a third transistor gate, the third transistor drain coupled to the first transistor drain, the third transistor source coupled to the controller, and the third transistor gate coupled to the second controller.

13. The system of claim 12, wherein the second controller is configured to control the first transistor to interact with the inductor in a boost mode of operation to charge the capacitor.

14. The system of claim 13, wherein the second controller is configured to control the first transistor to interact with the inductor in a buck mode of operation to discharge the capacitor to the IR LED.

15. The system of claim 12, wherein the second controller is configured to control the third transistor to interact with the inductor in a buck mode of operation according to constant current control to cause the capacitor to discharge to the IR LED.

16. The system of claim 12, wherein the resistor is a first resistor, and the driver further comprises a second resistor coupled between the third transistor source and ground.

17. The system of claim 12, wherein the resistor is a first resistor, and the driver further comprises a second resistor coupled between the first transistor source and ground.

* * * * *